United States Patent [19]

Blount

[11] 4,256,873

[45] Mar. 17, 1981

[54] PROCESS FOR THE PRODUCTION OF ORGANIC HYDROXY SILICATE COMPOUNDS AND THEIR RESINOUS PRODUCTS

[76] Inventor: David H. Blount, 5450 Lea St., San Diego, Calif. 92105

[21] Appl. No.: 970,449

[22] Filed: Dec. 18, 1978

[51] Int. Cl.³ .............................................. C08G 8/04
[52] U.S. Cl. .................................. 528/425; 521/154; 521/178; 525/474; 525/479; 528/31; 528/271; 528/418; 528/421; 556/483
[58] Field of Search ................. 528/31, 271, 418, 421, 528/425; 525/474, 479

[56] References Cited

U.S. PATENT DOCUMENTS

| | | | |
|---|---|---|---|
| 4,089,883 | 5/1978 | Blount | 536/102 |
| 4,097,424 | 6/1978 | Blount | 260/2.5 A |
| 4,125,703 | 11/1978 | Blount | 260/19 R |
| 4,139,549 | 2/1979 | Blount | 521/154 |

*Primary Examiner*—Morton Foelak

[57] ABSTRACT

A fine granular silica is reacted chemically with a polyhydroxy alcohol by using an alkali catalyst and heating the mixture, thereby producing an organic hydroxy silicate compound which will react chemically with polycarboxylic acids, polycarboxylic anhydrides, vinyl monomers and polyisocyanates to produce resinous products.

24 Claims, No Drawings

PROCESS FOR THE PRODUCTION OF ORGANIC HYDROXY SILICATE COMPOUNDS AND THEIR RESINOUS PRODUCTS

BACKGROUND OF THE INVENTION

This invention relates to a process for the production of organic hydroxy silicate compounds and their resinous products by reacting a fine granular silica ($SiO_2$) with a polyhydroxy alcohol in the presence of a strong alkali catalyst.

The silica ($SiO_2$) may be produced by any of the well known methods. The silica is preferred to be in the form of fine granules or powder.

The exact course of the reactions which take place during the process to produce organic hydroxy silicate compounds cannot be determined with 100% certainty. The alkali catalyst is necessary in this process because, when an organic polyhydroyl alcohol is heated with a fine granular silica without an alkali catalyst, no organic hydroxy silicate compound is produced. It is possible to produce a colloidal dispersion of silica hydrogel in polyols when a polyol is heated with a silicic acid ($SiO_2 \cdot x\ H_2O$) without the presence of an alkali catalyst, but not an organic hydroxy silicate.

Organic hydroxy silicate compounds will chemically react with polyisocyanates to produce useful and novel foams and resins which are soluble in organic solvents; these solutions may be used as a protective coating on wood. The novel organic hydroxy silicate compounds will react chemically with dicarboxylic acids and anhydrides by mixing and heating above the melting point of the dicarboxylic acid or dicarboxylic acid anhydride for 30 to 90 minutes while agitating to produce a poly(polyester silicate) resinous product which is soluble in organic solvents such as acetic acid. The said solution may be painted on wood, and it forms a tough, protective coating. The poly (polyester silicate) resinous product may be molded into useful products such as tool handles, knobs, gears, etc. with heat and pressure. The hydroxy silicate compounds may be ground into a fine powder and used as a filler in paints, varnishes, impregnants, laminates and molding powders.

SUMMARY OF THE INVENTION

I have discovered that a fine granular silica will react chemically with polyhydroxy alcohols and vegetable oils containing hydroxy radicals, such as castor oil, in the presence of a strong alkali at a temperature below the boiling temperature of the polyhydroxy alcohol to produce an organic hydroxy silicate compound. On further heating of the organic hydroxy silicate compound, a poly(organic hydroxy silicate) condensation product is produced. The silica is reacted with the polyol in the ratio of 1 part by weight of silica to 1 to 6 parts by weight of polyol. The polyhydroxy alcohols, as used in the Specifications and Claims, comprised:

(a) Glycerol, glycerol monochlorohydrin, sorbitol and mannitol.

(b) Glycols with free OH radicals, such as ethylene glycol, propylene glycol, butylene glycol, trimethylene glycol, tetramethylene glycol, pentamethylene glycol, hexamethylene glycol, diethylene glycol, triethylene glycol, dipropylene glycol, tetraethylene glycol, polyethylene glycols polypropylene glycol, polybutylene glycol and ether glycols.

(c) Bisphenol A, resorcinol, bis (beta-hydroxyethyl) terephthalate, pentaerythritol, trimethol propene, trimethol ethane: 2,2'-oxydiethanol and di and tripentaerythritol.

(d) Carbohydrates, such as glucose, mannose, fructose, molasses, cane sugar, dextranes, starches, corn syrup and maple syrup.

(e) Any mixture of the above polyhydroxy alcohols.

Various alkali compounds such as alkali metal oxides, alkali metal hydroxides and alkaline earth hydroxides. The preferred alkali metal hydroxides are sodium hydroxide and potassium hydroxide. The preferred alkaline metal hydroxide is calcium hydroxide. The chemical reaction takes place in basic solution with a pH of 10 to 12, as tested in an aqueous solution. The preferred alkali metal hydroxide compounds are added in the ratio of 1 to 2 parts by weight to 4 parts by weight of silica. It is preferred the alkali be in an aqueous solution.

The organic polyhydroxy silicate compounds are gray in color when in a basic solution and are white or clear in an acetic solution. The organic hydroxy silicate compounds produced by chemically reacting a polyol with a silicic acid is brown in color when in a basic solution. The brown polyol silicate compounds are produced by the method outlined in U.S. Patent Application Ser. No. 765,050, filed Feb. 27, 1977, by David H. Blount.

The organic polyhydroxy silicate compounds will react with a wide variety of polyisocyanates to produce urethane silicate prepolymer and poly (urethanesilicate) foam and resins. Suitable polyisocyanates are, for example, arylene polyisocyanates such as tolylene, metaphenylene, 4-chlorophenylene-1,3-; methylene-bis-(Phenylene-4-); bisphenylene-4,4'-; 3,3'-dimethoxybiphenylene-4,4'; 3,3'-diphenylbiphenylene-4,4'; naphthalene-1,5- and tetrahydronaphthalene-1,5-diisocyanates and triphenylmethane triisocyanate; Alkylene polyisocyanates such as ethylene; ethylidene; propylene-1,2-; butylene-1,4-; butylene-1,3-; hexylene-1,6-; decamethylene-1,10-; cyclohexylene-1,2-; cyclohexylene-1,4-; and methylene-bis(cyclohexyl-4'-) diisocycnates.

Toluene diisocycnates are preferred, especially a mixture of 80% of the 2,4-isomer and 20% of the 2,6-isomer thereof. Inorganic polyisocyanates, polyisothiocyanates and a phosgenation product of anilineformaldehyde condensation are also suitable according to the invention.

The organic polyhydroxy silicate compounds are reacted in the ratio of 2 parts by weight of 1 to 2 parts by weight of the polyiisocyanate compounds.

Various catalysts may be utilized to cure the urethane silicate prepolymer and to produce poly (urethane silicate) foams and resinous products such as water, aqueous magnesium hydroxide, aqueous sodium silicates, aqueous suspension of hydrated silica or silica, acetic acid, N-methylmorphaline, dimethyl ethanolamine, triethylamine, N-N'-diethycyclohexylamine, N,N'-dimethylcyclohexylamine, organic tin compounds and mixtures thereof. Water, together with an amine and/or a tin compound catalyst, has been found to be especially effective and is therefore preferred. The catalyst is used in the amount of 3% to 40% by weight, based on the weight of the urethane silicate prepolymer. If desired, suitable amounts of modifiers such as ethanol, ammonium oleate, sulphanated castor oil, manganous chloride, zinc stearate, paraffin oil, calcium stearate, dioctyl sulfosuccinate and mixtures thereof, may be added to modify the characteristics of the urethane silicate resins and foams.

If desired, special purpose additives, (5% to 50% by weight) such as plasticizers, fillers, curing rate modifiers, pigments and the like may be added to the urethane silicate prepolymer such as high-boiling aromatic ester plasticizers, coal tar, mineral oil, poly-alpha-methyl styrene and mercapto-terminated liquid polysulfide polymers. The poly (urethane silicate) products produced by this invention may be produced as non-porous or cellular products. The non-pourous may be rigid or elastic; the cellular products may be rigid, semi-rigid or soft. The poly (urethane silicate) products have good flame retardant properties. The urethane silicate products may be used for insulation, floatation, in boats and structural applications.

Liquid isocyanate-terminated polyurethane prepolymers will react chemically with the organic hydroxy silicate compounds and poly(organic hydroxy silicate) resinous product as produced in this invention. The organic hydroxy silicate compounds and poly (organic hydroxy silicate) resinous product may be mixed with a catalyst such as water, and they may be used as the curing agent for liquid isocyanate-terminated polyurethane prepolymers. They are mixed with the liquid isocyanate-terminated polyurethane prepolymer, in the amount of 10% to 100% by weight of the prepolymer. The catalyst, water, is mixed with the organic hydroxy silicate compounds and resinous product in the amount of 10% to 60% by weight, based on the weight of the organic hydroxy silicate compound and resinous product with a pH of 6 to 12.

Any of the commonly known isocyanate-terminated liquid polyurethane prepolymers may be reacted with or cured by the organic hydroxy silicate products and resinous products as produced in thes present invention with a catalyst such as water added. The catalyst may be added after the prepolymer reacts with the organic hydroxy silicate compounds or mixed with the organic hydroxy silicate compound.

As is known in the art, the isocyanate-terminated liquid polyurethane prepolymers may be made by reacting organic polyisocyanates in molar excess with hydroxyl-containing or carboxyl-containing polyesters, polyethers, polysulfides, polybutadienes and other polyols. The polyesters may be produced by any of the commonly known methods. The polyether polyols are useful in making polyurethane prepolymers and the methods to produce them are well known in the art. The hydroxy-group-containing polysulfide polymer may be utilized to produce polyurethane prepolymers. Hydroxyl-terminated polybutadiene homo-and copolymers may be utilized to produce polyurethane prepolymers.

Any suitable polyisocyanate may be reacted with the above-described hydroxyl-containing polymers to prepare the isocyanate-terminated polyurethane prepolymer such as the arylene polyisocyanates, alkylene polyisocyanates, and triphenylmethane triisocyanate as previously listed in this invention. Inorganic polyisocyanates may be utilized in this invantion. Toluene diisocyanates are preferred, especially a mixture of 80% of the 2,4-isomer and 20% of the 2,6-isomer thereof.

Plasticizers, fillers, curing rate modifiers, pigments, extender and the like may be added to the polyurethane prepolymer or at the time of curing and may be in the amount from 5% to 50% by weight based on the weight of the reactants. Plasterizers may include benzoate ester, phthalate esters, dipropylene glycol benzoate, dodecyl phthalete, prophylene glycol phthalate and mixtures thereof. Extenders may include high boiling coal tar distillates, mineral oil, poly (alphamethyl styrene) polymers, mercapto-terminated liquid polysulfide polymers and mixtures thereof.

Suitable emulsifiers and foam stabilizers may also be used according to this invention. Suitable emulsifiers are, e.g. the sodium salts of ricinoleic sulphonates or fatty acids, or salts of fatty acids with amines, e.g. oleic acid diethylamine or stearic acid diethanolamine; or alkali metal or ammonium salts of sulphonic acids and fatty acids. These additives are preferably used in quantities of up to 20% by weight, based on the reaction mixture.

Suitable foam stabilizers are mainly water-soluble polyether siloxanes and those described in U.S. Pat. No. 3,629,308. These additives are preferably used in quantities of up to 20% by weight, based on the reaction mixture.

Further examples of surface active additives, foam stabilizers, cell regulators, negative catalysts, stabilizers, flame retarding substances, plasticizers, dyes, fillers and fungicidal and bacteriocidal substances and details about methods of using these additives and their action may be found in Kunstsloff-Handbuch, Volume VI, published by Vieweg and Hochtlen, Carl-Hanser-Verlag, Munich 1966, e.g. on page 103 to 113.

Various dicarboxylic acnd polycarboxylic acids may be reacted chemically with the organic hydroxy silicate compounds to produce polyester silicate resinous condensation products.

Various dicarboxylic and polycarboxylic acids may be used, such as terephthalic, oxalic, malonic, glutaric, pimelic, succinic, phthalic, maleic, fumaric, adipic, azelaric, sebacic, isophthalic, itaconic acids and vegetable oils containing polycarboxylic acids.

In my novel process of this invention, the preferred process to produce polyester silicate resinous product is to chemically react organic hydroxy silicate compounds with polycarboxylic acids by mixing them, then heating to above the melting point of the polycarboxylic acid but below the boiling point while agitating for 30 to 60 minutes. The pH is then adjusted from a pH of 8 to 10, by the addition of a mineral acid or a hydrogen containing acid salt until the pH is 6 to 8 then heating is continued for 15 to 30 minutes or until the desired visiosity is obtained, thereby producing polyester silicate resinous products. The pH is tested in an aqueous solution.

The polyester silicate resinous products may be utilized as a molding powder, as a protective coating on wood or may be reacted with poly-isocyanates to produce polyurethane silicate foam or resins.

Other carboxyl containing compounds may be used alone or in combination with polycarboxyl acids or anhydrides to react chemically with the organic hydroxy silicate compound. Any suitable oils may be used such as soya bean, linseed, cottonseed, castor, dehydrated castor, tall, tung, fish, perilla, oiticica, sunflower, safflower, walnut oils, and mixtures thereof. The various oils may be converted to a monoglyceride before being added in my novel process. Any suitable organic compound containing a hydroxyl and a carboxylic radical may be used in the process of this invention such as 10-hydroxy undecanoic acid, 2-hydroxy decanoic acid, 10-hydroxy pentadecanoic acid, malic acid and mixtures thereof. Fatty acids may be reacted with the organic hydroxy silicate compounds.

Various decarboxylic anhydrides may be reacted chemically with the organic hydroxy silicate compounds to produce polyester silicate resinous condensation products.

Various dicarboxylic and polycarboxylic anhydrides may be used, such as phthalic, succinic, glutaric, tetrachlorophthalic, camphoric, diglycolic, pyromellitic, tetrahydrophthalic, dodecyenylsuccinic, hexadecylsuffinic, nitrophthalic, poly (adipic anhydride) and mixtures thereof.

The preferred method to produce polyester silicate resinous product by utilizing the organic hydroxyl silicate compounds with polycarboxylic acid anhydrides is to mix them in the ratio of 1 part by weight of the organic hydroxyl silicate to 0.5 to 3 parts by weight of the polycarboxylic acid anhydride then heat the mixture to above the melting point of the polycarboxylic acid anhydrides but below its boiling temperature while agitating at ambient pressure for 30 to 60 minutes. The pH of the mixture is 8 to 10 as tested in an aqueous solution. The pH is then altered by the addition of a dilute mineral acid, sulfuric acid, until the pH is 6 to 8. The mixture is then heated as above for 15 to 30 minutes while agitating, thereby producing polyester silicate resinous products.

These polyester silicate resinous products may be used as molding powders, as pretective coatings on wood, and may be used with vinyl monomers to produce rigid fiberglass panels and other products by hardening the mixture with a peroxide initiatior. The polyester silicate compounds will react chemically with polyisocyanates to produce foams and resins.

Epoxy compounds will react with the organic hydroxy silicate compounds to produce epoxy silicate compounds. The epoxy silicate compound may be polymerized and/or reacted with Lewis acids and amine compounds. About 2 to 3 mols of the epoxy compound is reacted with about 1 mol of the organic hydroxy compound.

The preferred method to produce epoxy silicate resinous products is to mix 2 to 3 mols of the epoxy compound with about 1 mol of the organic hydroxy silicate compound containing the alkali metal hydroxide catalyst then agitate the mixture at ambient pressure to 60 psig, keeping the temperature below the boiling temperature of the reactants for 10 to 60 minutes thereby producing an epoxy silicate compound. Epichlorohydrin is the preferred epoxy compound.

The epoxy silicate compound is catalyzed with an amino compound or a Lewis acid to produce a resinous product. The amine compound and some of the Lewis acids such as organic carboxylic acid anhydrides may be reacted with the epoxy silicate compound.

The preferred method to produce epoxy silicate foams is to mix 0.5 to 4 parts by weight of an organic hydroxy silicate compound with 1 to 2 parts by weight of an organic polyamine compound then slowly add 3 to 6 parts by weight of an epoxy compound while agitating and keeping the temperature between 20° to 70° C. for 10 to 30 minutes; the temperature is then increased to 80° to 100° C. until the mixture begins to expand thereby producing an epoxy silicate foam.

Any suitable epoxy compound may be used in this invention such as epichlorohydrin, glycidol, methyl epichlorohydrin, epoxidized olefins containing 2 or more epoxy groups per molecule, e.g. 1:2, 3:4-diepoxybutane, 2:3, 6:7-diepoxy-2,6-dimethyl-4-octene, and mixtures thereof.

Any suitable epoxidized polyhydroxy compounds may be used in this process. The epoxides of polyhydroxy compounds are produced by chemically reacting a peroxy acid such as peroxyacetic acid, peroxybenzoic acid and peroxy acid produced by oxidizing organic aldehydes. Any suitable epoxidized oils may be used in this process. The epoxidized oils are produced by chemically reacting peroxy acids with unsaturated vegetable oils such as castor oil. Any suitable epoxidized unsaturated organic compound may be used in this process. The epoxidized unsaturated compounds are produced by the chemical reaction of olefin compounds with peroxy acid compounds to produce epoxy compounds by epoxidation. Any suitable epoxidized polyhydroxy compounds produced by the chemical reaction of epichlorohydrin with a polyhydroxy compound may be used in this process. Any suitable epoxidized unsaturated fatty acid may be used in this process. The unsaturated fatty acids may be chemically reacted with epichlorohydrin or a peroxy acid compound to produce the epoxidized unsaturated fatty acid.

Best results are obtained when the epoxidized unsaturated organic compounds, epoxidized polyhydroxy compounds, epoxidized fatty acids, phenoxy resins and epoxidized vegetable oils are used with epichlorohydrin in the production of epoxy silicate resinous products and especially in the production of epoxy silicate foams. About 1 part by weight of epichlorohydrin is mixed with 0.5 to 4 parts by weight of said epoxidized compounds and resins. The epoxidized compounds and resins should contain 2 or more epoxy groups per molecule.

Various organic amine compounds may be used in this instant invention as the initiator (catalyst) or may also enter into the reaction such as alkylenepolyamines, alkyleneimines, arylenediamines, alkyleneamines, aryleneamines, condensation products of an epihalohydrin with ammonia, condensation products of a halohydrin with ammonia, hydrazine, alkanolamines, aminoethyl alkanolamine, polyamide compounds and resins with free amine groups, condensation products of carbon disulfide and polyamines with free amine groups, polyamine silicate compounds, vinyl amines and mixtures thereof. Alkylenepolyamines are preferred.

Typical alkylenepolyamines are ethylenediamine, 1,3-propylenediamine, 1,4-diamino-n-butane, pentamethylenediamine, 1,6-diamino-3-methyl-n-hexane, 1,6-diamino-n-hexane; 1,10-diamino-n-decane, octamethylenediamine, diethylenetriamine, triethylenetetramine and the corresponding polypropylenepolyamines and polybutylenepolyamines.

Acrylic compounds will react with organic hydroxy silicate compounds to produce acrylic compounds and resinous products. Vinyl monomers, aliphatic allyl compounds, organic dienes, organic oxides and aliphatic hydrocarbons and mixtures thereof may be copolymerized with the acrylic compounds and organic hydroxyl silicate to produce an organic copolymer-organic hydroxy silicate resinous product.

The preferred method to produce acrylic organic silicate compounds is to mix about 1 to 2 mols of an acrylic acid compound and about 1 mol of an organic hydroxy silicate compound as produced in this invention, then to heat the mixture to just below the boiling temperature of the reactants while agitating for 20 to 60 minutes thereby producing an acrylic organic hydroxy silicate compound. It is then polymerized by using an initiator to produce an acrylic organic hydroxy silicate resinous product. Acrylate compounds may be used in place of the acrylic acid compound; the acrylate compound appears to react with the organic hydrosilicate compounds by the process known as alcoholysis. These acrylic organic silicate compounds may be polymerized by an initiator by any of the commonly known methods such as mass method, solvent method or in an aqueous solution.

The preferred method to produce acrylic organic hydroxy silicate resinous products is to mix 0.5 to 4 parts by weight of an organic hydroxy silicate compound containing the alkali metal hydroxide catalyst as produced in this invention with 1 to 50 parts by weight of an acrylic compound; then a catalytic amount of an initiator is added. The mixture is agitated at a temperature between ambient temperature to a temperature just below the boiling temperature of the reactants at ambient pressure to 60 psig for 0.5 to 12 hours thereby producing an acrylic organic hydroxy resinous product.

The preferred method to produce organic copolymer-organic hydroxy silicate resinous products is to mix 0.5 to 4 parts by weight of an organic hydroxy silicate compound containing the alkali metal hydroxide catalyst as produced in this invention, 1 to 10 parts by weight of an acrylic compound and 0.5 to 10 parts by weight of a polymerable organic compound, selected from the group consisting of vinyl monomers, organic dienes, aliphatic allyl compounds, organic oxides, aliphatic hydrocarbons and mixtures thereof; then a catalytic amount of an initiator is added, and the mixture is agitated at a temperature wherein the polymerable organic compound is in a liquid state and at ambient pressure to 60 psig for 0.5 to 12 hours thereby producing an organic copolymer-organic hydroxy silicate resinous product.

Suitable acrylic compounds include but are not limited to acrylic acid, methacrylic acid, ethyl acrylic acid, crotonic acid, chloroacrylic acid, fluoroacrylic acid, cyclohexyl methacrylic acid, isobutyl methacrylic acid, bromoacrylic acid, hydroacrylic acid, benzyl acrylic acid, methyl methacrylate, methyl acrylate, ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl α-chloroacrylate, 2-chloroethyl acrylate, 1,1-dihydroperfluorobutyl acrylate, lauryl acrylate, cyclohexyl-cyclohexyl methacrylate, allyl methacrylate and mixtures thereof.

Suitable vinyl monomers include styrene, vinyl acetate, vinyl chloride, vinylidine chloride, acrylonitrile, vinyl toluenes, N-vinyl carbazole, vinyl pyrolidone, vinylidine cyanide, alkyl vinyl ketones, aryl vinyl ketones, methacrylonitrile and mixtures thereof.

Suitable organic dienes include isoprene, chloroprene, butadiene and mixtures thereof.

Suitable allyl compounds include allyl alcohol, 3-chloropropene, 3-bromopropene, methallyl chloride and mixtures thereof.

Suitable organic oxides include ethylene oxide propylene oxide, styrene oxide and mixtures thereof.

Suitable organic aliphatic hydrocarbons include ethylene and propylene.

Any suitable initiator may be used to catalyze the polymerization of the acrylic organic hydroxy silicate compounds and the copolymerization of the polymerable organic compounds and organic hydroxy silicate compounds. Suitable initiators include but are not limited to organic and inorganic peroxides, alkali metal persulfates, ammonium persulfate, redox systems, aliphatic azo compounds, organic and inorganic peroxide with organic or inorganic metal compounds. Suitable peroxide initiators include but are not limited to hydrogen peroxide and acyl or aryl peroxides such as p-methane hydroperoxide, ethyl ketone peroxide, benzoyl peroxide, acetyl benzyl peroxide, p-chlorobenzoyl peroxide, alkoxy benzoyl peroxide, lauryl peroxide, dibutyryl peroxide, dicaproyl peroxide, crotonyl peroxide, di-tert-alkyl peroxide, methyl amyl ketone peroxide, di-tert-butyl diphosphate peroxide, peracetic acid, cyclohexyl hypoperoxide and mixtures thereof. Suitable alkali metal persulfates include ammonium persulfate potassium persulfate and sodium persulfate. Any suitable commonly known redox systems as known in the arts may be used. Other initiator systems may be used such as peroxides with metal compounds as activators such as ethyl ketone peroxide with cobalt naphthenate, potassium persulfate with ferric sulfate or cupric sulfate (0.001 to 0.002 parts by weight per part by weight of the polymerable compound), benzoyl peroxide with a tertiary amine activator, such as N,N-dimethyl aniline and in certain cases sulfuric acid may be used.

Any suitable emulsifiers may be used in the reaction of this invention. Typical emulsifiers include sodium alkyl sulfates, soaps of fatty acids, (oleic, myristic, palmetric), anionic and cationic emulsifying agents and mixtures thereof.

The liquid epoxy silicate resinous product may be modified by adding an additive up to 50% by weight. Typical additives include dicarboxylic acid, dicarboxylic acid anhydrides, polyhydroxy compounds, polysulfide polymers, alkali sulfides, sodium polysulfides, allyl halides, organic polyisocyanates, aminoplasts, phenoplasts, fatty or rosin acids, furfural-ketone resins, aldehydes, ketones, dibutyl phthlates, tricresyl phosphate, polyamides, fatty acid diamines, styrene oxide, acetonitrile, polymerized oils, carbon disulfide, vegetable oils, wood flower, cellulose, lignin, cellulose derivitives, polyester polymers, polyether polymers, acrylic acid, polymers, vinyl monomers and liquid polymers, phenols, allyl alcohol, alkali metal cyanides, polyurethane prepolymers, thioplasts, furan resins, alginic acid, liquid aliphatic dienes, triallyl cyanurate, sulfur, paraffin oil and mixtures thereof.

The acrylic organic hydroxy silicate compounds and resinous products may be modified with an alkali metal cyanide to produce a cyanoacrylate organic hydroxy silicate compounds and resinous products. About 1 to 10 mols of the alkali metal cyanide such as sodium cyanide and potassium cyanide may be added per 10 mols of acrylic compound and per 0.5 to 5 mols of an organic hydroxy silicate compound as produced by the process of claim 1. The alkali metal group is then reacted with a dilute organic or inorganic acid to form a salt then is filtered off. The alkali metal cyanide, organic hydroxy silicate, acrylic compounds and polymerable organic compounds such as vinyl monomers aliphatic allyl compounds, organic dienes, organic oxides, ethylene, propylene and mixture thereof may be copolymerized together by the use of an initiator such as an organic or inorganic peroxide, alkali metal persulfate, ammonium persulfate, etc. The cyanoacrylate organic hydroxy silicate resinous products are produced by the same process as the acrylate organic hydroxy silicate resinous products.

This invention is a re-application of U.S. Patent Application Ser. No. 848,605, filed Nov. 4, 1977 by David H. Blount, now abandoned. This invention utilized silica (SiO$_2$) and not hydrated silica (SiO$_2$.xH$_2$O) as utilized in U.S. Pat. No. 4,089,883.

The object of the present invention is to produce organic hydroxy silicates. Another object is to produce organic polyhydroxy silicates which will react chemically with dicarboxyl acids and anhydrides to produce useful resinous products. Still another object is to produce organic polyhydroxy silicates which will react chemically with polyisocyanates and polyurethane prepolymers to produce useful foams and resinous products. A further object is to produce polyhydroxy silicate compounds to be used in paints and varnishes as a filler. Another object is to produce organic polyhydroxy silicate compounds that will react chemically with epoxy compounds to produce useful resinous products. Another object is to produce organic polyhydroxy silicate compounds that are soluble in organic solvents and which may be used as a protective coating on wood. Another object is to produce vinyl silicate resinous products by reacting the organic polyhydroxy silicate compounds with vinyl monomers.

DESCRIPTION OF PREFERRED EMBODIMENTS

My invention will be illustrated in greater detail by the specific examples that follow, it being understood that these preferred embodiments are illustrative of, but not limited to, procedures which may be used in the production of organic hydroxy silicate compounds and their resinous products. Parts and percentages are by weight unless otherwise indicated.

EXAMPLE I

About 1 part by weight of fine granular silica, 1 part by weight of glycerol, 0.5 part by weight of sodium hydroxide flakes and 4 parts by weight of water are mixed then heated to just below the boiling temperature of the mixture for 30 to 60 minutes while agitating at ambient pressure, thereby producing glycerol silicate compound.

The said compound is added to glacial acetic acid to form a solution and then filtered; about 20% to 25% of the silica is filtered out. Part of the silica that is filtered out has reacted with glycerol to form glycerol disilicate.

EXAMPLE II 2 parts by weight of fine granular silica, 0.5 part by weight of potassium hydroxide and 5 parts by weight of water are mixed then heated to 80 degrees to 100 degrees C. for 10 to 30 minutes. 3 parts by weight of ethylene glycol are added to the mixture then heated to just below the boiling point of ethylene glycol while agitating for 30 to 60 minutes, thereby producing ethylene glycol silicate compound.

The mixture of ethylene glycol silicate are soluble in glacial acetic acid. About 20% to 25% of the silica and ethylene glycol disilicate are not soluble in acetic acid.

EXAMPLE III 2 parts by weight of fine granular silica, 0.5 part by weight of sodium hydroxide and 3 parts by weight of propylene glycol are mixed in 6 parts by weight of water. The mixture is then agitated while heating to a temperature of from 80 degrees C. to just below the boiling point of propylene glycol for 30 to 60 minutes at ambient pressure, thereby producing a gray mixture of propyleneglycol silicate. A dilute mineral acid, sulfuric acid, may be added to said mixture until the pH is about 7.

EXAMPLE IV 2 parts by weight of fine granular silica, 4 parts by weight of diethylene glycol, and 10 parts by weight of water are mixed, then sodium hydroxide flakes are added until the pH is 10 to 12. The mixture is then heated to just below the boiling point of the mixture for 30 to 60 minutes, thereby producing diethylene glycol silicate.

EXAMPLE V 2 parts by weight of fine granular silica, 0.5 parts by weight of sodium hydroxide flakes, 4 parts by weight of triethylene silicate and 8 parts by weight of water are mixed, then the mixture is heated to just below the boiling point of the mixture while agitating for 30 to 60 minutes at ambient pressure, thereby producing triethylene glycol silicate.

The sodium hydroxide in the mixture is reacted with a dilute sulfuric acid by mixing the dilute acid in the said mixture until the pH is 7 to 8.

EXAMPLE VI

About 2 parts by weight of fine granular silica, 3 parts by weight of 1,4-butanediol, 0.5 part by weight of sodium hydroxide flakes and 10 parts by weight of water are mixed. The mixture is heated to just below the boiling temperature of the mixture while agitating for 30 to 60 minutes, thereby producing butanediol silicate.

EXAMPLE VII

About 2 parts by weight of fine granular silica, 3 parts by weight of 2,2'-oxydiethanol and 0.5 part by weight of sodium hydroxide flakes are mixed in 10 parts by weight of water. The mixture is then heated to just below the boiling temperature of the mixture while agitating at ambient pressure. The temperature of the mixture is then elevated to the boiling temperature of 2,2'-oxydiethanol while agitating for 30 to 60 minutes, thereby producing 2,2'-oxydiethanol silicate.

EXAMPLE VIII

About 2 parts by weight of fine granular silica, 1 part by weight of trimethylol propane, 2 parts by weight of ethylene glycol, 0.5 parts by weight of sodium hydroxide flakes and 10 parts by weight of water are mixed. The mixture is then heated to just below the boiling temperature of the mixture while agitating for 30 to 60 minutes at ambient pressure, thereby producing ethylene glycol silicate and trimethylol propane silicate.

EXAMPLE IX 2 parts by weight of fine granular silica, 6 parts by weight of polyethylene glycol (380 to 420 mol wt.) and 0.5 part by weight of sodium hydroxide are mixed in 10 parts by weight of water. The mixture is then heated to just below the boiling temperature of the mixture while agitating for 30 to 60 minutes, thereby producing polyethylene glycol silicate.

EXAMPLE X

About 2 parts by weight of fine granular silica, 6 parts by weight of castor oil, 1 part by weight of sodium hydroxide flakes and 10 parts by weight of water are mixed. The mixture is then heated to just below the boiling point of the mixture while agitating for 30 to 60 minutes at ambient pressure, thereby producing a thick gray castor oil silicate liquid. A dilute mineral acid, hydrochloric acid, is added until the pH is about 7 to 8.

EXAMPLE XI

About 2 parts by weight of fine granular silica, 4 parts by weight of 2-butyne-1,4-diol in an aqueous solution are mixed, then potassium hydroxide pellets are added until the pH is 10 to 12. The mixture is then heated to just below the boiling temperature of the mixture while agitating for 30 to 60 minutes, thereby producing 2-butyne-1,4-diol silicate.

EXAMPLE XII

About 2 parts by weight of fine granular silica, 4 parts by weight of granular cane sugar and 0.5 part by weight of sodium hydroxide are mixed in water. The mixture is then heated to about the boiling temperature of the mixture for 30 to 60 minutes while agitating at ambient pressure, thereby producing a gray, solid can sugar silicate.

The cane sugar silicate is soluble in water, and on filteration of the solution, about 15% to 25% of the silica is filtered out. Part of the filtered out silica has reacted chemically with the cane sugar.

EXAMPLE XIII

About 2 parts by weight of fine granular silica, 3 parts by weight of corn starch and 0.5 part by weight of sodium hydroxide flakes are mixed in water. The mixture is then heated to just below the boiling point of the mixture for 30 to 60 minutes while agitating at ambient pressure, thereby producing gray starch silicate. About 70% of the starch silicate is soluble in water.

EXAMPLE XIV

About 2 parts by weight of fine granular silica, 4 parts by weight of 10-hydroxy undecanoic acid, 0.25 part by weight of sodium hydroxide, and 10 parts by weight of water are mixed. The mixture is then heated to just below the boiling temperature of the mixture while agitating for 30 to 60 minutes, thereby producing 10-hydroxy undecanoic acid silicate and poly (hydroxy undecanoic acid silicate) resinous compound.

The pH of the mixture is altered by adding a hydrogen containing acid salt, sodium hydrogen sulfate, until the pH is 8 to 10 (as tested in water). The mixture is then heated to above the melting temperature but below the boiling temperature of 10-hydroxy undecanoic acid while agitating at ambient pressure for 30 to 60 minutes, thereby producing polyester silicate resinous product.

EXAMPLE XV

About equal parts by weight of a mixture of triethylene glycol silicate as produced in Example V with a pH of 7 to 8 and toluene diisocyanate (80% 2,4- and 20%, 2,6-) are mixed, then the mixture is agitated at ambient temperature and pressure for 15 to 20 minutes. Then a catalyst, 10% by weight of water is added, and in a few minutes the mixture expands to 6 to 8 times its original volume, thereby producing a polyurethane silicate foam. The foam is heated to about 90 degrees C. for 30 to 90 minutes, thereby producing a semi rigid foam.

The foam may be used for insulation and floatation in boats and is soluble in acetic acid. The solution of the urethane silicate foam may be painted on wood and forms a tough, clear, protective coating.

EXAMPLE XVI

About equal parts by weight of the mixture of glycerol silicate as produced in Example I and toluene diisocyanate (80% 2,4- and 20% 2,6-) are slowly mixed at ambient temperature and pressure then agitated for 10 to 20 minutes, thereby producing a polyurethane silicate prepolymer. A catalyst, aqueous solution of sodium silicate, 40% by weight, is added and mixed for a few minutes until the mixture begins to expand. The mixture expands to 6 to 10 times its original volume. The foam is then heated to about 90 degrees C. for 30 to 90 minutes, thereby producing a rigid, self-standing urethane silicate foam.

The foam may be used for insulation, floatation in boats and as a structural support. The urethane silicate foam is soluble in acetic acid and may be used as a protective coating on wood. It forms a tough, clear, protective coating.

EXAMPLE XVII

About equal parts by weight of the castor oil silicate as produced in Example X and toluene diisocyanate (80% 2,4- and 20% 2,6-) are slowly mixed then agitated at ambient temperature and pressure for 10 to 20 minutes, thereby producing a urethane silicate prepolymer.

A catalyst, 3 to 5% by weight of glacial acetic acid is added and then mixed for a few minutes until the mixture begins to expand. The mixture expands to 6 to 10 times its original volume to produce a tough semi-rigid foam. The foam is heated to about 90 degrees C. for 30 to 90 minutes for further curing.

EXAMPLE XVIII

About 2 parts by weight of polyethylene glycol silicate as produced in Example IX and 1 part by weight of toluene diisocyanate (80% 2,4- and 20% 2,6- isomers) are slowly mixed then agitated at ambient temperature and pressure for 10 to 20 minutes, thereby producing urethane silicate prepolymers.

A catalyst, water with a small amount of triethylenediamine in the amount of 5% of total weight of reactants, is added and then mixed for a few minutes until the mixture begins to expand. The mixture expands to 6 to 10 times its original volume to produce a tough, soft to semi-rigid foam. The foam is heated to about 90 degrees C. for 30 to 90 minutes for further curing.

EXAMPLE XIX 1 part by weight of the mixture of ethylene glycol silicate as produced in Example II, and 1 part by weight of adipic acid are mixed. The mixture has a pH of 8 to 10 in an aqueous solution. The mixture is then heated to above the melting temperature and below the boiling temperature of adipic acid while agitating at ambient pressure for 30 to 60 minutes. A dilute mineral acid, sulfuric acid, is added until the pH is 6 to 8 as tested in an aqueous solution, then heating is continued as stated while agitating for 15 to 30 minutes, thereby producing a gray, hard, solid polyester silicate resinous product.

The polyester silicate resinous product softens with heat and may be molded into useful products such as gears, knobs, etc.

EXAMPLE XX

About 2 parts by weight of the mixture of ethylene glycol trimethol propane silicate as produced in Example VIII, and one part by weight of maleic acid are mixed. The mixture has a pH of 8 to 10, as tested in an aqueous solution. The mixture is then heated to above the melting point, but below the boiling temperature of maleic acid for 30 to 60 minutes while agitating at ambient pressure, thereby producing polyester silicate. The pH is then adjusted to a pH of 6 to 8 by the addition of a dilute mineral acid, hydrochloric acid, then continue heating to the above temperature while agitating for 15 to 30 minutes or until the desired viscosity is produced, thereby producing a hard, tough, gray, polyester silicate resinous product.

EXAMPLE XXI

About 1 part by weigh of the mixture of glycerol silicate compound as produced in Example I, and 1 part by weight of phthalic acid are mixed. The mixture has a pH of 8 to 10 as tested in water. The mixture is then heated to above the melting temperature, but below the boiling temperature of phthalic acid while agitating at ambient pressure for 30 to 60 minutes, thereby producing polyester silicate resinous product.

The polyester silicate resinous product may be used to product polyerethane rigid foams by reacting about equal parts by weight of the said polyester silicate resinous product with about equal parts of toluene diisocyanate (80% 2,4- and 20% 2,6-isomers) and agitating for 10 to 20 minutes then adding a catalyst, water (3% to 10% of total weight of reactants). The mixture is agitated for a few minutes until the mixture begins to expand. The mixture expands 6 to 10 times its original volume, thereby producing a rigid self-standing foam. The foam may be used for insulation, floatation or as a coating agent.

EXAMPLE XXII

About 2 parts by weight of the mixture of 2,2'-oxydiethanol silicate compound as produced in Example VII, 1 part by weight of phthalic anhydride and 1 part by weight of succinic anhydride are mixed. The mixture has a pH of 8 to 10 as tested in water. The mixture is then heated to above the melting point, but below the boiling temperature of the anhydrides while agitating at ambient pressure for 30 to 60 minutes, thereby producing polyester silicate resinous product.

The polyester silicate resinous product is soluble in suitable organic solvents and may be used as a protective coating on wood.

EXAMPLE XXIII

About 2 parts by weight of the mixture of propylene glycol silicate as produced in Example III, are mixed with 1 part by weight of maleic anhydride and 0.5 parts by weight of linseed oil. The pH of the mixture is 8 to 10 as tested in an aqueous solution. The mixture is then heated to above the melting point, but below the boiling temperature of maleic anhydride while agitating for 30 to 60 minutes at ambient pressure, thereby producing polyester silicate resinous product.

A dilute mineral acid, sulfurric acid, is added to the polyester silicate resinous product until the pH is 6 to 8 as tested in an aqueous solution. The polyester silicate resinous product is then heated as before, while agitating for 15 to 30 minutes, thereby producing a hard, tough, polyester resinous product that is soluble in suitable organic solvents and may be used as a protective coating on wood.

EXAMPLE XXIV 2 parts by weight of the mixture of diethylene glycol silicate which has a pH of 10 to 12 as produced in Example IV, 1 part by weight of succinic anhydride, 1 part by weight of furmaric acid and 1 part by weight of monoglyceride of fatty acids and glycerol are mixed. The mixture is heated to above the melting point of the reactants, but below the boiling temperature of the reactants while agitating for 30 to 60 minutes at ambient pressure, thereby producing polyester silicate resinous product.

A dilute mineral acid, sulfuric acid is added to the polyester silicate resinous product until the pH is 6 to 8 (as tested in an aqueous solution). The polyester silicate resinous product is then heated above the melting temperature while agitating for 15 to 30 minutes, thereby producing a gray, hard, tough, solid, polyester silicate resinous product.

EXAMPLE XXV 4 parts by weight of the mixture of ethylene glycol silicate as produced in Example II, 1 part by weight of phthalic anhydride, 1 part by weight of sebacic acid and 2 parts by weight of maleic anhydride are mixed. The mixture is then heated to above the melting point of the reactants but below the boiling temperature of the reactants while agitating at ambient pressure for 30 to 60 minutes, thereby producing an unsaturated polyester silicate resinous product.

A dilute mineral acid, such as sulfurric acid, is added until the pH is 6 to 8 (as tested in water). Then styrene is added to the unsaturated polyester silicate resinous product in the amount of 20% to 30% of the total weight are mixed. The mixture is polymerized by a peroxide-type initiator, such as methyl ethyl ketone peroxide (0.05 to 0.5%), with an activator cobalt naphthenate salt (30 to 100 ppm) within 30 minutes to 12 hours, thereby producing a tough, solid, polyester resinous product.

Other vinyl monomers may be added in place of styrene or combined with styrene such as vinyl toluene, acrylic and methacrylic esters, acrylonitrile and vinyl acetate. Other free-radical initiators, such as peroxides and azo compounds may be used to polymerize the mixture. The organic peroxides can be modified by activators and promoters, and they are readily available.

EXAMPLE XXVI

A polyurethane prepolymer was prepared by reacting toluene diisocyanate (80% to 2,4- and 20% 2,6) with polypropylene glycol (500 to 750 mol. wt.) in molar ratio of about 2:1. 4 parts by weight of said prepolymer are mixed with 1 part by weight of the mixture of ethylene glycol silicate as produced in Example II, containing 30% water by weight and agitated for a few minutes, thereby producing a polyurethane silicate, a tough, rubbery solid.

EXAMPLE XXVII

A polyurethane prepolymer was prepared by reacting 0.75 mol of ethylene glycol, 0.25 mol of propylene glycol and 1 mol of adipic acid to produce a polyester having a molecular weight of about 1800. The polyester was reacted with toluene diisocyanate to produce a polyurethane with a NCO content of about 4%. About 4 parts by weight of said prepolymer are mixed with 1 part by weight of diethylene silicate as produced in Example IV, and are mixed; then 0.25 parts by weight of water are added. The mixture is cured in about 12 hours to produce an elastomer.

EXAMPLE XXVIII

Liquid hydroxyl-terminated polybutadiene is reacted with toluene diisocyanate to produce a polyurethane prepolymer with a free NCO content of about 4%, then 4 parts by weight of the prepolymer are mixed with 1 part by weight of the mixture of butanediol silicate compound are mixed then agitated for a few minutes. About 0.25 parts by weight of water containing a small amount of triethylenediamine and stannous octoate is then mixed into the mixture and agitated for a few minutes then heated in an oven at 150 degrees to 100 degrees C. for 3 to 4 hours, thereby producing a solid, rubbery, polyurethane silicate product.

EXAMPLE XXIX 1 part by weight of polyurethane prepolymer as produced in Example XXVI, but with about 4% free NCO, 1 part by weight of liquid polysulfide polymer (LP-2), 0.1 part by weight of lead dioxide curing paste and 1 part by weight of the diethylene glycol silicate compound as produced in Example IV, containing 30% water, are mixed thoroughly, and in a short time a hard, cured, rubbery polyurethane silicate product is produced.

EXAMPLE XXX

Polypropylene glycol, with an average molecular weight of 500, is reacted with toluene diisocyanate to produce a polyurethane prepolymer having about 20% NCO groups. About 3 parts by weight of said polyurethane prepolymer and 2 parts by weight of a mixture of glycerol silicate compound as produced in Example I, containing 50% water and a small amount of stannous octoate (0.005 parts by weight) and triethylenediamine (0.01 parts by weight) are mixed thoroughly and allowed to stand at room temperature. The mixture expands in 30 to 60 minutes and forms a cured, rigid, finely cellular polyurethane silicate product.

EXAMPLE XXXI

About 2 mols of epichlorohydrin and 1 mol of glycerol silicate containing the sodium hydroxide catalyst as produced in Example 1 are mixed, then the mixture is heated in a closed system at ambient pressure to just below the boiling temperature of the reactants for 10 to 60 minutes thereby producing an epoxy glycerol silicate compound. About 0.5 mol of ethylenediamine is mixed with the epoxy glycerol silicate compound while agitating for 1 to 5 minutes thereby producing an epoxy silicate resinous product. These products may be used as adhesive in paint production and as a surface coating agent.

EXAMPLE XXXII

About 3 mols of an epoxy compound and 1 mol of an organic silicate listed in this example are mixed; then the mixture is heated in a closed system at ambient pressure and to 60 psig to just below the boiling temperature of the reactants for 10 to 60 minutes thereby producing an epoxy organic silicate compound. Then a catalytic amount to 2 mols of an amine, diethylenetriamine, are added to the epoxy organic silicate compound and thoroughly mixed, and within 1 to 60 minutes an epoxy silicate resinous product is produced.

| Example | Organic hydroxy silicate | Produced in Example | Epoxy Compound |
|---|---|---|---|
| a. | glycerol silicate | 1 | epichlorohydrin |
| b. | ethylene glycol silicate | 2 | methyl epichlorohydrin |
| c. | propylene glycol silicate | 3 | 1:2, 3:4-diepoxybutane |
| d. | diethylene glycol silicate | 4 | 2:3, 6:7-diepoxy-2,6-dimethyl-4-octene |
| e. | triethylene glycol silicate | 5 | 1 part epichlorohydrin with 2 parts by weight of bisphenol A epoxy resin |
| f. | butanediol silicate | 6 | 1 part epichlorohydrin with 4 parts of diglycidyl ether of bisphenol epoxy resin |
| g. | 2,2'-oxydiethanol silicate | 7 | 1 part epichlorohydrin with 3 parts of fatty acid epoxy resin |

Other amines may be used in place of diethylenediamine such as ethylene diamine, propylenediamine, tetramethylenediamine, pentamethylenediamine, hexamethylenediamine, octamethylenediamine, decamethylenediamine, xylylenediamine, piperazine, triethylenetetramine, tetraethylenepentamine and corresponding polypropylenepolyamines and polybutylenepolyamines and mixtures thereof.

The epoxy organic hydroxy silicate compound is mixed with the amine catalyst then applied in a thin layer to 2 pieces of wood. The two pieces of wood are put together, and the epoxy silicate resinous product cures into a strong, solid adhesive thereby gluing the wood together. The epoxy silicate resinous product may be applied to layers of fiberglass while still in the liquid state then harden to produce strong, solid fiberglass products such as chairs, toys, boats, etc.

EXAMPLE XXXIII

About 0.5 part by weight of the glycerol silicate compound containing the sodium hydroxide catalyst as produced in Example 1 and 1 part by weight of propylenediamine are mixed; then 3 parts by weight of epichlorohydrin are slowly added while agitating and keeping the temperature between 20 degrees to 70 degrees C. for 10 to 30 minutes; the temperature is then increased to 80 degrees to 100 degrees C. until the mixture begins to expand thereby producing an epoxy silicate foam.

EXAMPLE XXXIV

About 4 parts by weight of an organic hydroxy silicate and 2 parts by weight of an organic polyamine as selected from the list in this example are mixed; then 6 parts by weight of an epoxy compound, selected from the list in this example, are slowly added while agitating and keeping the temperature between 20 degrees to 70 degrees C. for 10 to 30 minutes, the temperature is then increased to 80 degrees to 100 degrees C. until the liquid epoxy silicate resinous product begins to expand thereby producing an epoxy silicate foam.

| Example | Organic hydroxy silicate | Produced in Example | Epoxy compound |
|---|---|---|---|
| a. | glycerol silicate | 1 | epichlorohydrin |
| b. | ethylene glycol silicate | 2 | methyl epichlorohydrin |
| c. | polyethylene glycol silicate | 9 | epichlorohydrin |
| d. | castor oil silicate | 10 | epichlorohydrin |
| e. | butanediol silicate | 6 | 1:2, 3:4-diepoxybutane |
| f. | 2,2'-oxydiethanol silicate | 7 | 1 part epichlorohydrin with 3 parts by weight of unsaturated vegetable oil epoxy resin |
| g. | starch silicate | 13 | 1 part epichlorohydrin with 1 part 1:2, 3:4-diepoxybutane |

The polyamines used in this example are:
(a) ethylenediamine
(b) propylenediamine
(c) hexamethylenediamine
(d) tetraethylenepentamine
(e) tetrapropylenepentamine
(f) tetramethylenediamine
(g) triethylenetetramine The liquid epoxy silicate resinous product may be poured into a mold then heated to 80 degrees to 100 degrees C., and the resinous product expands to produce a solid, soft foam 3 to 12 times its original volume. This foam may be used for heat and sound insulation, as packaging material to protect fragile objects, etc.

The liquid epoxy silicate resinous product may be modified by adding up to 50% by weight of a modifier of additive.

EXAMPLE XXXV

About 1 part by weight of glycerol silicate as produced in example and containing the sodium hydroxide catalyst is mixed with about 1 part by weight of acrylic acid then heated at ambient pressure to just below the boiling temperature of acrylic acid for 20 to 60 minutes while agitating thereby producing acrylic acidglycerol silicate resinous product.

EXAMPLE XXXVI

About 1 part by weight of glycerol silicate with the sodium hydroxide catalyst as produced in Example 1, about 1 part by weight of sodium cyanide and 3 parts by weight of acrylic acid are mixed then heated at ambient pressure to just below the boiling temperature of acrylic acid while agitating for 20 to 60 minutes thereby producing sodium cyanoacrylate-glycerol silicate resinous product. A dilute hydrochloric acid is added in the amount equal to the mols of the of the alkali metal group to produce sodium chloride then is filtered off.

Other acrylic acid compounds, organic hydroxy silicates and metal cyanides may be used in place of the ones used in this example as listed below to produce alkali cyanoacrylic-organic silicate compounds. The alkali catalyst polymerizes the acrylic acid.

| Example | Organic hydroxy silicate | Produced in Example | Acrylic Acid | Alkali Cyanide |
|---|---|---|---|---|
| a. | ethylene glycol silicate | 2 | ethyl acrylic acid | sodium cyanide |
| b. | propylene glycol silicate | 3 | hydroacrylic acid | potassium cyanide |
| c. | diethylene glycol silicate | 4 | chloroacrylic acid | sodium cyanide |
| d. | butanediol silicate | 6 | methacrylic acid | sodium cyanide |
| e. | triethylene glycol silicate | 5 | benzyl acrylic acid | potassium cyanide |
| f. | starch silicate | 13 | methacrylic acid | sodium cyanide |

EXAMPLE XXXVI

The cyanoacrylate-organic hydroxy silicate compounds produced in Example 36, a thru f, are polymerized by adding an initiator listed below; then the mixture is agitated at ambient temperature for 0.5 to 12 hours thereby producing cyanoacrylate-organic hydroxy silicate resinous products. The temperature may be elecated to just below the boiling temperature of the reactants.

| Product produced In Example | Initiator used |
|---|---|
| 35 a | 0.01 part per weight of potassium sulfate |
| 35 b | 0.01 to 0.02 parts by weight of potassium sulfate, 0.001 to 0.002 parts by weight of ferric sulfate |
| 35 c | 0.01 to 0.05 parts by weight of methyl ethyl ketone peroxide and 0. to 100 ppm of cobalt naphthenate. |
| 35 d | 0.01 part by weight of hydrogen peroxide, 0.001 part by weight of ferric sulfate and 0.01 part by weight of lauryl mercaptan in water |
| 35 e | 0.01 to 0.05 part by weight of cumene hydroperoxide in water |
| 35 f | 0.01 to 0.02 part by weight of ammonium persulfate, 0.001 to 0.002 part by weight of sodium thiosulfate in water |

The cyanoacrylate-organic hydroxy silicate resinous products in an aqueous emulsion form may be used as an adhesive to glue wood, metal, cloth and plastic together. It may also be used in the production of paints and used as a surface protecting agent on wood. The cyanoacrylate-organic hydroxy silicate resinous products may be ground into molding powder and molded into useful objects such as sheets, rods, toys, chairs, etc. by heat and pressure.

EXAMPLE XXXVIII

About 1 part by weight of glycerol silicate as produced in Example 1 and 1 to 50 parts by weight of an acrylic compound listed in this example are mixed then an initiator, 0.01 to 0.05 part by weight of potassium persulfate, is added. The mixture is agitated at ambient temperature to just below the boiling point of the reactants for 0.5 to 12 hours thereby producing an acrylic organic hydroxy silicate resinous product.

The acrylic compound may be selected from the following: acrylic acid, methacrylic acid, ethyl acrylic acid, isobutyl methacrylic acid, crotonic acid, chloroacrylic acid, fluoroacrylic acid, cyclohexyl methacrylic acid, bromoacrylic acid, hydroacrylic acid, benzyl acrylic acid, methyl methacrylate, methyl acrylate ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl α-chloroacrylate, 2-chloroethyl acrylate, 1,1-dihydroperfluorobutyl acrylate, lauryl acrylate, cyclohexyl-cyclohexyl methacrylate, allyl methacrylate and mixtures thereof.

The acrylic organic hydroxy silicate resinous products may be ground into a molding powder then molded into useful objects such as rods, sheets, plates, toys, etc., by heat and pressure. The acrylic organic hydroxy silicate resinous products while still in a liquid state may be poured into molds of useful products such as rods, sheets, art objects, etc. and let the liquid solidify. The acrylic organic hydroxy silicate resinous products may be produced in an emulsion form by adding water with the initiator. The emulsion may be used as a protective coating on wood, as an adhesive for wood, cloth, ceramics, plastics, etc., and in the manufacturing of reinforced sheets of fiberglass by applying the emulsion to fiberglass and let it dry. Fillers may be added to the resinous products, inorganic or organic fillers.

EXAMPLE XXXIX

About 0.5 to 4 parts by weight of an organic hydroxy silicate compound containing an alkali metal catalyst as listed in this Example, 1 to 10 parts by weight of an acrylic compound and 0.5 to 10 parts by weight of a polymerable organic compound listed in this example are mixed in an aqueous solution containing 1 to 3% soap; then 0.01 to 0.05 part by weight of potassium persulfate is added. The mixture is then agitated at a temperature wherein the reactants are in a liquid or compressed state at ambient pressure to 60 psig for 0.5 to 12 hours thereby producing an organic copolymer-organic hydroxy silicate resinous product.

| Example | Organic hydroxy silicate | Produced in Example | Polymerable compound |
|---|---|---|---|
| a. | 0.5 part glycerol silicate | 1 | 1 part acrylic acid 5 parts styrene |
| b. | 1 part ethylene glycol silicate | 2 | 5 parts methacrylic acid, 2 parts acrolonitrile |
| c. | 2 parts propylene glycol | 3 | 3 parts methacrylic acid, 2 parts methyl methacrylic acid 2 parts vinyl acetate |
| d. | 3 parts triethylene glycol silicate | 4 | 2 parts methyl acrylate 1 part hydroacrylic acid, 2 parts vinyl chloride |
| e. | 4 parts of diethylene glycol | 4 | 2 parts methyl methacrylate, 1 part acrylonitrile, 1 part styrene, 3 parts butadiene |
| f. | 1 part glycerol silicate | 1 | 1 part acrylic acid 1 part isoprene 2 parts butadiene |
| g. | 1 part ethylene glycerol silicate and 1 part glycerol silicate | 2 | 2 parts ethyl acrylic acid, 1 part chloroprene, 1 part vinylidine chloride |
| h. | 1 part glycerol silicate | 1 | 1 part acrylic acid 1 part ethylene oxide 1 part styrene |
| i. | 1 part propylene silicate | 3 | 2 parts methacrylic acid, 1 part allyl chloride |
| j. | 1 part diethylene glycol silicate | 4 | 2 parts acrylic acid 2 parts propylene glycol |
| k. | 2 parts glycerol silicate | 1 | 2 parts methacrylic acid, 2 parts ethylene |
| l. | 1 part ethylene glycol silicate | 4 | 2 parts chloroacrylic acid, 1 part propylene |
| m. | 2 parts diethylene glycol silicate | 4 | 2 parts methacrylic acid, 1 part styrene oxide, 0.5 part methallyl chloride |
| n. | 2 parts glycerol silicate | 1 | 4 parts cyclohexyl methacrylic acid, 1 part allyl alcohol 1 part acrylonitrile |

The organic copolymer-organic hydroxy silicate resinous product aqueous emulsions may be used as adhesive on wood, metal, cloth and plastics. They may be painted on wood and used as a protective coating.

EXAMPLE XXXX

About 2 parts by weight of the methacrylic acid and 1 part by weight of ethylene glycerol silicate as produced in Example 2 are mixed then heated to just below the boiling temperature of the reactants while agitating for 20 to 60 minutes thereby producing an acrylic organic hydroxy silicate compound.

Other acrylic compounds may be used in place of methacrylic acid such as ethyl acrylic acid, crotonic acid, chloroacrylic acid, fluoroacrylic acid, cyclohexyl methacrylic acid, isobutyl methacrylic acid, bromoacrylic acid, hydroacrylic acid, benzyl acrylic acid, methyl methacrylate, methyl acrylate, ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl α-chloroacrylate, 2-chloroethyl acrylate, 1,1-dihydroperfluorobutyl acrylate, lauryl acrylate, cyclohexyl-cyclohexyl methacrylate, allyl methacrylate and mixtures thereof.

EXAMPLE XXXXI

About 100 parts by weight of the methacrylate ethylene glycol silicate compound as produced in Example 40, 1 part by weight potassium persulfate and 0.001 part by weight of ferric sulfate are added to 200 parts by weight of water containing 2 parts by weight of soap then agitated at ambient temperature to just below the boiling temperature of the reactants for 0.5 to 12 hours thereby producing methacrylate ethylene glycol silicate resinous products.

The other acrylic organic hydroxy silicate compounds listed in Example 40 may be polymerized by the same method. Other organic or inorganic peroxides, alkyl metal persulfates, ammonium persulfate and redox systems may be used as the initiator.

The acrylic organic hydroxy silicate resinous products have many uses such as a coating on wood, metal or plastics and as an adhesive for wood; it may be dried and used as a molding powder and molded into useful products such as rods, sheets, toys, art objects, etc. by heat and pressure.

Although specific conditions and ingredients have been described in conjunction with the above examples of preferred embodiments these may be varied, and other reagents and additives may be used where suitable, as described above, with similar results.

Other modifications and applications of this invention will occur to those skilled in the art upon reading this disclosure. These are intended to be included within the scope of this invention, as defined in the appended claims.

I claim:

1. The process for the production of an epoxy silicate resinous product by the following steps:
   (a) mixing 1 part by weight of fine granular silica with 1 to 6 parts by weight of an organic polyhydroxy compound;
   (b) adding 0.25 to 1 part by weight of an alkali metal hydroxide catalyst, selected from the group consisting of sodium hydroxide and potassium, in water;
   (c) heating the mixture to just below the boiling temperature of the mixture while agitating for 30 to 60 minutes, thereby producing an organic hydroxy silicate compound;
   (d) adding 2 to 3 mols of an epoxy compound to about 1 mol of said organic hydroxy silicate compound then agitating while heating, at ambient pressure to 60 psig, to just below the boiling temperature of the reactants for 10 to 60 minutes, thereby
   (e) producing an epoxy organic hydroxy silicate compound;
   (f) adding a catalytic amount to 1 mol for each mol of the epoxy hydroxide silicate compound of a catalyst selected from the group consisting of a Lewis acid and an amine compound, thereby
   (g) producing an epoxy silicate resinous product.

2. The process of claim 1 wherein the epoxy compound is selected from the group consisting of epichlorohydrin, 1 part by weight of epichlorohydrin with 0.5 to 4 parts by weight of an epoxy resin containing 2 or more reactive epoxy groups per molecule, 1 part by weight of epichlorohydrin with 0.5 to 4 parts by weight of an epoxidized olefin compound containing 2 or more reactive epoxy groups per molecule and mixtures thereof.

3. The process of claim 1 wherein the amine compound is selected from the group consisting of primary aliphatic polyamines, primary aromatic polyamines, polyamides containing 2 or more reactive amine groups per molecule, and mixtures thereof.

4. The product by the process of claim 1.

5. The process for the production of an acrylate organic hydroxy silicate resinous product by the following steps:
   (a) mixing 1 part by weight of fine granular silica with 1 to 6 parts by weight of an organic polyhydroxy compound;
   (b) adding 0.25 to 1 part by weight of an alkali metal hydroxide catalyst, selected from the group consisting of sodium hydroxide and potassium hydroxide, in water;
   (c) heating the mixture to just below the boiling temperature of the mixture while agitating for 30 to 60 minutes, thereby producing an organic hydroxy silicate compound;
   (d) mixing 0.5 to 4 parts by weight of said organic hydroxy silicate compound and an acrylic compound in the amount of 1 to 50 parts by weight and selected from the group consisting of acrylic acid, methacrylic acid, ethyl acrylic acid, crotonic acid, chloroacrylic acid, fluoroacrylic acid, cyclohexyl methacrylic acid, isobutyl methacrylic acid, bromoacrylic acid, hydroacrylic acid, benzyl acrylic acid, methyl methacrylate, methyl acrylate, ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl α-chloroacrylate, 2-chloroethyl acrylate, 1,1-dihydroperfluorobutyl acrylate, lauryl acrylate, cyclohexyl-cyclohexyl methacrylate, allyl methacrylate and mixtures thereof; then a catalytic amount of an initiator is added, and the mixture is agitated at ambient pressure to 60 psig at a temperature of ambient temperature to just below the boiling point of the reactants for 0.5 to 12 hours, thereby
   (e) producing an acrylate organic hydroxy silicate resinous product.

6. The process of claim 5 wherein the initiator is selected from the group consisting of a peroxide initiator, alkali persulfate, peroxide initiator utilized in a redox system, peroxide initiator with a metal compound activator and ammonium persulfate.

7. The process for the production of an organic copolymer-organic hydroxy silicate resinous product by the following steps:
   (a) mixing 1 part by weight of fine granular silica with 1 to 6 parts by weight of an organic polyhydroxy compound;
   (b) adding 0.25 to 1 part by weight of an alkali metal hydroxide, selected from the group consisting of sodium hydroxide and potassium hydroxide, in water;
   (c) heating the mixture to just below the boiling temperature of the mixture while agitating for 30 to 60 minutes, thereby producing an organic hydroxy silicate compound;
   (d) mixing 0.5 to 4 parts by weight of said organic hydroxy silicate compound with 1 to 10 parts by weight of an acrylic compound and 0.5 to 10 parts by weight of a polymerable organic compound, selected from the group consisting of vinyl monomers, organic dienes, aliphatic allyl compounds, organic oxides, aliphatic hydrocarbons and mixtures thereof; then a catalytic amount of an initiator is added, and the mixture is agitated at a temperature wherein the reactants are in a liquid or compressed state and at ambient pressure to 60 psig for 0.5 to 12 hours, thereby producing an organic copolymer-organic hydroxy silicate resinous product.

8. The process of claim 7 wherein the vinyl monomer is selected from the group consisting of styrene, vinyl acetate, vinyl chloride, vinylidene chloride, acrylonitrile, vinyl toluenes and mixtures thereof.

9. The process of claim 7 wherein the organic diene is selected from the group consisting of isoprene, chloroprene, butadiene and mixtures thereof.

10. The process of claim 7 wherein the aliphatic allyl compound is selected from the group consisting of allyl alcohol, 3-chloropropene, 3-bromopropene, methallyl chloride and mixtures thereof.

11. The process of claim 7 wherein the organic oxide is selected from the group consisting of propylene oxide, ethylene oxide, styrene oxide ane mixtures thereof.

12. The process of claim 7 wherein the organic aliphatic hydrocarbon is selected from the group consisting of ethylene and propylene.

13. The process of claim 7 wherein the initiator is selected from the group consisting of peroxide initiators, alkali metal persulfates, ammonium persulfate peroxide initiator utilized in a redox system and peroxide initators with a metal compound activator.

14. The process for the production of an acrylate organic hydroxy silicate resinous product by the following steps:
   (a) mixing 1 part by weight of fine granular silica with 1 to 6 parts by weight of an organic polyhydroxy compound;
   (b) adding 0.25 to 1 part by weight of an alkali metal hydroxide, selected from the group consisting of sodium hydroxide and potassium hydroxide, in water;
   (c) heating the mixture to just below the boiling temperature of the mixture while agitating for 30 to 60 minutes, thereby producing an organic hydroxy silicate compound;
   (d) mixing about 1 mol of said organic hydroxy silicate with 1 to 2 mols of an acrylic acid compound, then heating to just below the boiling temperature of the reactants while agitating for 20 to 60 minutes, thereby producing an acrylate organic hydroxy silicate compound; then a catalytic amount of an initiator, selected from the group consisting of peroxide initiators, alkali metal persulfate, ammonium persulfate, peroxide initiator utilized in a redox system and a peroxide initiator with a metal compound activator, is added while agitating the mixture at ambient temperature to just below the boiling point of the reactants for 0.5 to 12 hours, thereby producing an acrylate organic hydroxy silicate resinous product.

15. The product produced by the process of claim 14.

16. The process for the production of a cyanoacrylate-organic hydroxy silicate resinous product by the following steps:
   (a) mixing 1 part by weight of fine granular silica with 1 to 6 parts by weight of an organic polyhydroxy compound;
   (b) adding 0.25 to 1 part by weight of an alkali metal hydroxide selected from the group consisting of sodium hydroxide and potassium hydroxide, in water;
   (c) heating the mixture to just below the boiling temperature of the mixture while agitating for 30 to 60 minutes, thereby producing an organic hydroxy silicate compound;
   (d) adding about 1 to 10 mols of an alkali metal cyanide, selected from the group consisting of sodium cyanide and potassium cyanide, and 10 mols of an acrylic acid compound, selected from the group consisting of acrylic acid, methacrylic acid, ethyl acrylic acid, chloroacrylic acid, hydroacrylic acid, isobutyl methacrylic acid, fluoroacrylic acid, crotonic acid, bromoacrylic acid, benzyl acrylic acid and mixtures thereof, to 0.5 to 5 mols of said organic hydroxy compound, then heating to just below the boiling temperature of the reactants while agitating for 20 to 60 minutes, thereby producing an alkali metal cyanoacrylate organic hydroxy silicate compound;
   (e) adding a dilute mineral acid in the amount of mols equal to the mols of alkali metal atoms to said alkali metal cyanoacrylate organic hydroxy silicate compound while agitating, and the salt is then filtered off, thereby producing a cyanoacrylate organic hydroxy silicate compound;
   (f) adding a catalytic amount of an initiator, selected from the group consisting of peroxide initiators, alkali metal persulfates, ammonium persulfates, peroxide initiator utilized in a redox system and peroxide initiators with a metal compound activator, to the cyanoacrylate organic hydroxy silicate compound while agitating at ambient temperature to just below the boiling temperature of the reactants for 0.5 to 12 hours, thereby producing a cyano-acrylate-organic hydroxy silicate resinous product.

17. The product by the process of claim 16.

18. The process of claim 1 wherein the organic polyhydroxy compound is selected from the group consisting of glycerol, glycerol monochlorohydrin, sorbitol, mannitol, pentaerythritol, di- and tripentaerythritol, ethylene glycol, propylene glycol, butylene glycol, trimeth glycol, tetramethylene glycol, pentamethylene glycol, hexamethylene glycol, diethylene glycol, polyethylene glycols and ether glycol, triethylene glycol, dipropylene glycol, tetraethylene glycol, bis(betahydroxyethyl) terephthalate, trimethylol propane, trimethylol ethane, 2,2'-oxydiethanol, glucose, mannose, fructose, molasses, cane sugar, dextrines, starches, corn syrup, maple syrup and mixtures thereof.

19. The process of claim 5 wherein the organic polyhydroxy compound is selected from the group consisting of glycerol, glycerol monochlorohydrin, sorbitol, mannitol, pentaerythritol, di- and tripentaerythritol, ethylene glycol, propylene glycol, butylene glycol, trimethylene glycol, tetramethylene glycol, pentamethylene glycol, hexamethylene glycol, diethylene glycol, polyethylene glycols and ether glycol, triethylene glycol, dipropylene glycol, tetraethylene glycol, bis(betahydroxy-ethyl) terephthalate, trimethylol propane, trimethylol ethane, 2,2'-oxydiethanol, glucose, mannose, fructose, molasses, cane sugar, dextrines, starches, corn syrup, maple syrup and mixtures thereof.

20. The process of claim 7 wherein the organic polyhydroxy compound is selected from the group consisting of glycerol, glycerol monochlorohydrin, sorbitol, mannitol, pentaerythritol, di- and tripentaerythritol, ethylene glycol, propylene glycol, butylene glycol, trimethylene glycol, tetramethylene glycol, pentamethylene glycol, hexamethylene glycol, diethylene glycol, polyethylene glycols and ether glycol, triethylene glycol, dipropylene glycol, tetraethylene glycol, bis(betahydroxyethyl) terephthalate, trimethylol propane, trimethylol ethane, 2,2'-oxydiethanol, glucose, mannose, fructose, molasses, cane sugar, dextrines, starches, corn syrup, maple syrup and mixtures thereof.

21. The process of claim 14 wherein the organic polyhydroxy compound is selected from the group consisting of glycerol, glycerol monochlorohydrin, sorbitol, mannitol, pentaerythritol, di- and tripentaerythritol, ethylene glycol, propylene glycol, butylene glycol, trimethylene glycol, tetramethylene glycol, pentamethylene glycol, hexamethylene glycol, diethylene glycol, polyethylene glycols and ether glycol, triethylene glycol, dipropylene glycol, tetraethylene glycol, bis(betahydroxyethyl) terephthalate, trimethylol propane, trimethylol ethane, 2,2'-oxydiethanol, glucose, mannose, fructose, molasses, cane sugar, dextrines, starches, corn syrup, maple syrup and mixtures thereof.

22. The process of claim 16 wherein the organic polyhydroxy compound is selected from the group consisting of glycerol, glycerol monochlorohydrin, sorbitol, mannitol, pentaerythritol, di- and tripentaerythritol, ethylene glycol, propylene glycol, butylene glycol, trimethylene glycol, tetramethylene glycol, pentamethylene glycol, hexamethylene glycol, diethylene glycol, polyethylene glycols and ether glycol, triethylene glycol, dipropylene glycol, tetraethylene glycol, bis(-betahydroxyethyl) terephthalate, trimethylol propane, trimethylol ethane, 2,2'-oxydiethanol, glucose, mannose, fructose, molasses, cane sugar, dextrines, starches, corn syrup, maple syrup and mixtures thereof.

23. The product produced by the process of claim 5.
24. The product produced by the process of claim 7.

* * * * *